United States Patent [19]

Dudeck

[11] Patent Number: 4,827,660
[45] Date of Patent: May 9, 1989

[54] EXTENDED SURFACE LURE

[75] Inventor: David H. Dudeck, White Bear Lake, Minn.

[73] Assignee: Heron Manufacturing, Inc., Minneapolis, Minn.

[21] Appl. No.: 219,716

[22] Filed: Jul. 15, 1988

[51] Int. Cl.⁴ ............................................. A01K 85/00
[52] U.S. Cl. .................................. 43/42.39; 43/42.11; 43/42.37
[58] Field of Search ................. 43/42.39, 42.37, 42.11, 43/42.13, 42.19

[56] References Cited

U.S. PATENT DOCUMENTS

| | | | |
|---|---|---|---|
| 2,795,886 | 6/1957 | Johnson | 43/44.81 |
| 2,817,922 | 12/1957 | Takeshita | 43/42.37 |
| 2,877,592 | 3/1959 | Basgall | 43/42.37 |
| 3,197,909 | 8/1965 | Adams | 43/42.37 |
| 3,546,804 | 12/1970 | Woolums | 43/42.11 |
| 3,918,192 | 11/1976 | Rabideau | 43/42.17 |
| 4,003,154 | 1/1977 | Carver | 43/42.13 |
| 4,045,903 | 9/1977 | Parker | 43/42.11 |
| 4,425,730 | 1/1984 | Goetz, Jr. | 43/42.11 |
| 4,662,100 | 5/1987 | Yarusso | 43/42.37 |
| 4,667,437 | 5/1987 | Dworski | 43/42.36 |
| 4,712,326 | 12/1987 | Hoover | 43/42.39 |
| 4,713,907 | 12/1987 | Dudeck | 43/42.39 |
| 4,745,700 | 5/1988 | Davis | 43/42.13 |

Primary Examiner—Gene P. Crosby
Attorney, Agent, or Firm—Kinney & Lange

[57] ABSTRACT

A fishing lure having a fishhook with opposing curves at the shank and hook ends thereof, and a hydrodynamic effect body affixed to the shank with plane-like portions extending on either side thereof to provide the desired motion and control of the lure.

16 Claims, 2 Drawing Sheets

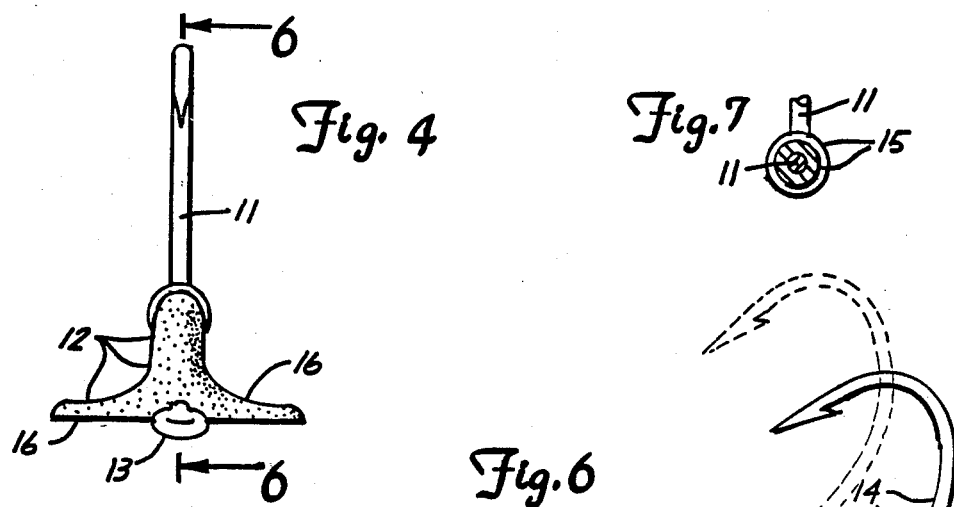
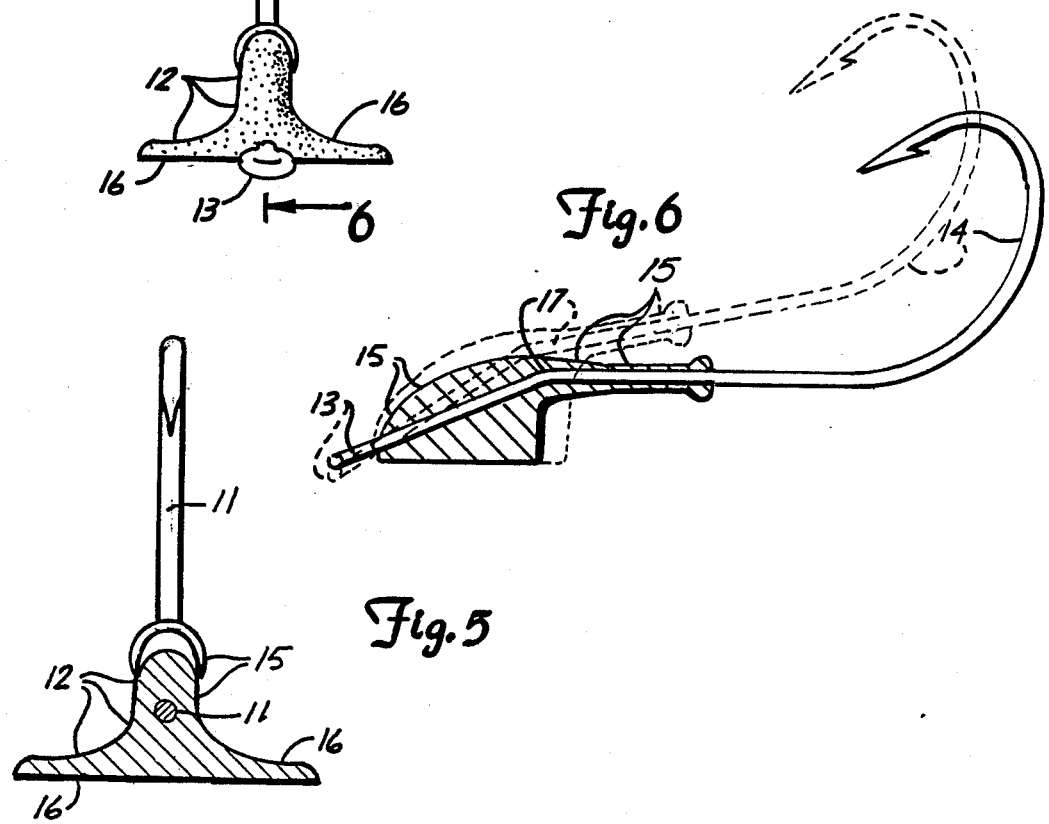
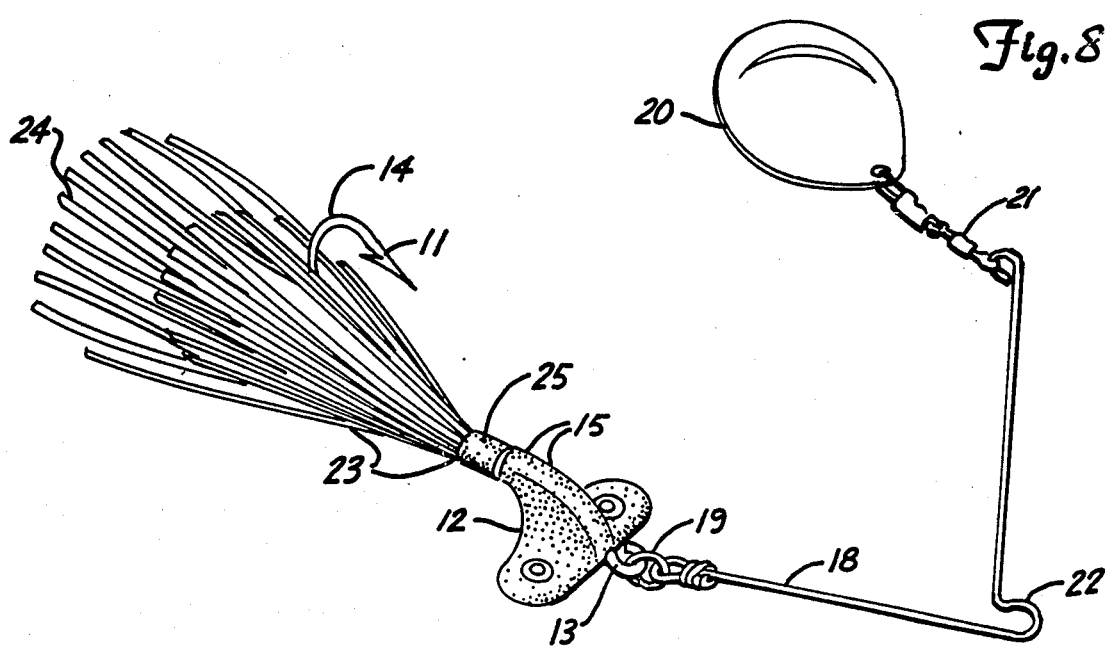

EXTENDED SURFACE LURE

BACKGROUND OF THE INVENTION

The present invention relates to fishing lures and, more particularly, to a lure which exhibits a swimming-like motion and an ability to stay upright when on the bottom of a body of water.

Fish are known to be attracted to fishing lures which exhibit a swimming-like motion as they move in water. Achieving a sufficiently attractive motion in the water to lure fish, however, is a difficult feat. Achieving the proper motion under control of the fisherman is difficult because of the many hydrodynamic variables involved. Further, even if a lure is designed to provide an adequate motion on retrieval, such a lure often provides no such motion after a cast while settling toward the bottom, thus reducing its attractiveness to fish.

In addition, controlling the depth of a lure on retrieval is also often difficult for the fisherman. The hydrodynamic characteristics of the lure which give it an attractive motion during retrieval may interfere with the ability of the fisherman to control its depth during the retrieval. Thus, a fishing lure is desired which can provide motions attractive to fish both during the settling phase and the retrieval phase of a single cast, and can be controlled with respect to the depth at which it operates.

SUMMARY OF THE INVENTION

The present invention provides a fishhook means with opposed curves at the shank and hook end of the fishhook, and a hydrodynamic effect body affixed to the shank at the end of the fishhook opposite the hooking portion leaving the eye exposed. The hydrodynamic effect body has plane-like portions extending on either side thereof near the eye to provide the desired motion and permit the desired control of the lure. A wire-like harness with a spinner can be attached to the eye to increase the attractiveness of the lure to fish, and a skirt with flexible strands or extensions can also be attached to the lure so that the extensions extend past the hooking portion of the fishhook.

BRIEF DESCRIPTION OF THE DRAWINGS

FIG. 4 shows a front view of the present invention,

FIG. 5 shows a cross section view with a portion of the front removed,

FIG. 6 shows a cross section view with a portion of the side removed,

FIG. 7 shows a cross section view with a greater portion of the front removed, and FIG. 8 shows a further embodiment of the present invention.

DETAILED DESCRIPTION OF THE PREFERRED EMBODIMENTS

Figure 1:
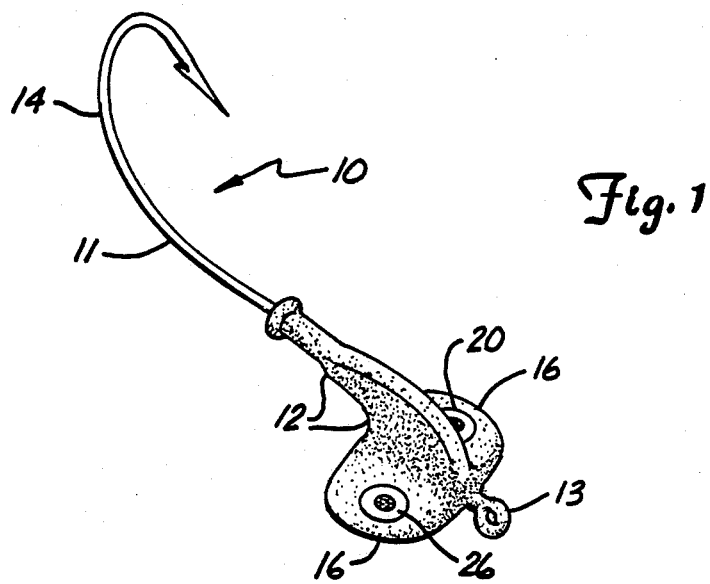
FIG. 1 shows a perspective view of the present invention.

FIG. 1 shows a view of a fishing lure device, 10, of the present invention in its basic form unadorned with any further articles for attracting fish of kinds such as will be described below. The device is formed about a fishhook, 11, by having a hydrydynamic effect body, 12, molded about the shank of fishhook 11 toward an end thereof. A fisherman can control the device of FIG. 1 in the water through a fishing line, leader, etc., connected to an eye, 13, formed at one end of fishhook 11, and extending past and slightly below hydrodynamic effect body 12 at the front of the device, as can be seen in FIGS. 2 and 4.

Fishhook 11 is of the kind having a bend in the shank portion thereof located nearer to eye 13 than to hooking portion, 14, on the opposite end of that hook. The bend, as will be better seen in another figure, occurs in substantially the same plane as that approximately defined by the curving in fishhook 11 used to form hooking portion 14. Fishhook 11 is suitably provided as a 3/0 Wright & McGill #41 fishhook.

Figure 2:
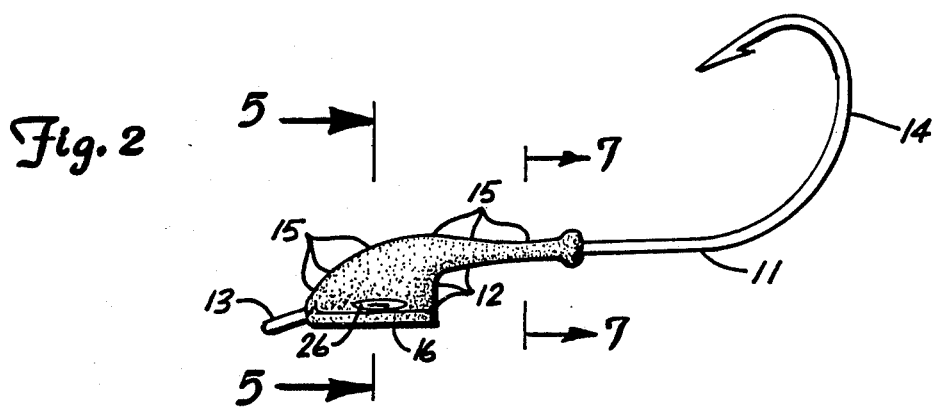
FIG. 2 shows a side view of the present invention.

The upper portion of body 12 in FIG. 1 is molded around the shank of fishhook 11 leaving eye 13 and hooking portion 14 exposed, as can be seen in more detail in FIGS. 2 and 6. Body 12 has its upper, or connecting, portion, 15, affixed to the shank of fishhook 11 beginning on that side of the bend in the shank closest to hooking portion 14 and continuing toward and coming near to eye 13. Between the bend in the shank of the fishhook and eye 13, connecting portion 15 flares away from the shank of fishhook 11 on the interior side of the bend to smoothly join with a hydrofoil portion, 16, of body 12.

This arrangement can be best seen in the cross section view of FIG. 6 where the bend, 17, in the shank of fishhook 11 can be clearly seen. Connecting portion 15 is seen to be molded along the shank of fishhook 11. Just at, or just past, bend 17, the connecting portion 15, on the interior side of bend 17, begins to have its edge rapidly separate from the shank of fishhook 11 as it drops to meet hydrofoil portion 16. This can be further seen in the cross section view of FIG. 5 where a front portion of the device, as shown in the front view of FIG. 4, has been removed to permit seeing the shape of body 12 where connecting portion 15 drops to flare smoothly into hydrofoil portion 16. The other end of connecting portion 15 of body 12 is essentially circular in cross section, as can be seen in FIG. 7 with most of the front of the device as shown in FIG. 4 removed. These various cross section views are taken at locations indicated in FIGS. 2 and 4.

Hydrofoil portion 16 is what gives the device its primary hydrodynamic effects when the device is being retrieved after a cast or trolled through water, and when the device is settling toward the bottom after a cast. In all of these situations, a swimming-like action results from the motion of the device through the water because of the relatively large, substantially flat (though not necessarily very flat) surface of hydrofoil portion 16 shown in FIG. 3 and its relation to connecting portion 15 and fishhook 11.

The flow of water about the device is slightly unstable causing the device to oscillate from right to left and back to give a swimming-like motion. Hooking portion 14 extending to the back provides enough stability to keep the oscillation controlled and sufficiently repeatable. The period of the oscillation is affected by the speed of the device moving through the water decreasing with an increase in speed. The relatively large, substantially flat surface on the bottom of hydrofoil portion 16 also permits the fisherman to control the depth reached by the lure planing to it while traveling through the water up in traveling through water by controlling the rapidity of the motion of the device through the water.

The weight of body 12 is chosen to be sufficiently great so that the moment arm through the weight of hooking portion 14 is insufficient to cause the device to tip away from resting on the broad surface of hydrofoil portion 16 in those instances when the device is lying on the bottom of a body of water, such as after a cast. The weight chosen for body 12 is typically one-half ounce to three-quarters ounce or more. As earlier stated, the device exhibits a swimming-like motion when settling toward the bottom after a cast, so that the device in those circumstances appears to swim toward the bottom and then rest there until a retrieval begins. Such retrieval again leads to a motion simulating a swimming action as it planes upward toward the surface of the water on the broad surface of hydrofoil portion 16.

The extent of hydrofoil portion 16 to either side of connecting portion 15 must be carefully selected. The extent should be at least two to three times the thickness of the hydrofoil portion 16 at a point halfway out from connecting portion 15 to its end, and the bottom surface of hydrofoil portion 16 should be three to four times the width of the connecting portion. However, an extent much greater than that will limit the effect of water flow on the skirt. On the other hand, too small an extent will lead to little or no side-to-side oscillation. This extent of the hydrofoil portion 16 will allow a sufficiently fast retrieve to bring lure 10 all the way to the surface of the body of water, and slower, steady retrieves will allow the user to operate device 10 at selected depths below the surface of the water.

Figure 3:
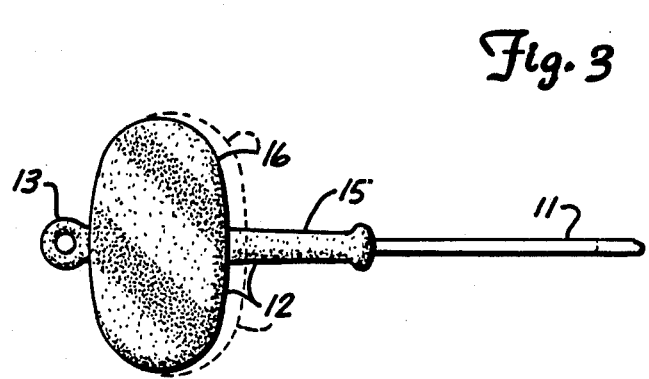
FIG. 3 shows a bottom view of the present invention.

The heavier the weight chosen for body 12, the greater the force required to have device 10 plane up to a desired depth. For that reason, the planing angle on retrieval with respect to the direction of motion should be greater for heavier versions of body 12 versus lighter ones, and the bottom surface area should be increased somewhat. The dashed line representations of device 10 shown in FIGS. 3 and 6 show these resulting adjustments on the geometry of that device for a heavier body 12. Note that the angle of the main shank portion of fishhook 12 to the right of bend 17 has been increased with respect to the bottom surface of hydrofoil portion 16 as has the other shank portion to the left of bend 17.

FIG. 8 shows the addition of further attractive means to the lure of FIG. 1. A wire harness, 18, is shown connected by a ring, 19, to eye 13. At the other end of wire harness 18 is a spinner blade, 20, connected to wire harness 18 by a connection means, 21, which permits spinner blade 20 to rotate when drawn through the water. A jog, 22, is shown in wire harness 18 at an approximately midway point where a right angle is provided. A fisherman is to connect a fishing line or leader or the like to this jog. The rotation of spinner blade 20 provides an additional attraction to fish, and the use of ring 19 permits device 10 to oscillate from side to side, as indicated above, without undue restriction.

Further, there is shown a skirt arrangement, 23, formed of elongated and flexible material strands or extensions, such a material typically being an elastomer such as natural or synthetic rubber. The elongated flexible strands, 24, are joined together at one end by a belt means, 25, which is slipped over connecting portion 15 of body 12. Flexible strands 24 extend past hooking portion 14 of hook 11 to again render the device more attractive to fish.

As also has been shown in FIGS. 1 and 2, eye-like concentric circles, 26, with the interior circle center portion filled, are provided on the upper surfaces of hydrofoil 16 to increase the attractiveness to fish. In this regard, body 12 may be colored in many different ways to also increase attractiveness to fish and, similarly, skirt arrangement 23 can be of many different colors for this purpose, including using multiple colors among different ones of strands 24.

Although the present invention has been described with reference to preferred embodiments, workers skilled in the art will recognize that changes may be made in form and detail without departing from the spirit and scope of the invention.

What is claimed is:

1. A fishing lure comprising:
 a fishhook means having a shank with an eye at one end thereof and joined oppositely from said eye along a major axis thereof to a hooking portion that substantially curves about in a plane toward said eye end of said shank to end in a point, said shank having a bend therein substantially in that same plane in which said hooking portion substantially curves so that said eye and a portion of said shank lie in that plane substantially along a secondary axis which forms an angle with said primary axis; and
 a hydrodynamic effect body of a mass greater than that of said fishhook means affixed to said shank by a connecting portion of said hydrodynamic effect body which begins at that side of said bend closest to said hooking portion and extends along said bend toward said eye but so as to leave said eye exposed, said connecting portion being smoothly joined with a hydrofoil portion of said hydrodynamic effect body on that side of said shank which is interior to said bend, said hydrofoil portion formed except where joined with said connecting portion, as a relatively thin layer that is substantially flat on that side thereof opposite said connecting portion extending on either side of said connecting portion substantially perpendicular to said plane.

2. The apparatus of claim 1 wherein said thin layer extends on either side of said connecting portion to a distance at least twice that thickness occurring in said thin layer at a point halfway between an end thereof and said connecting portion.

3. The apparatus of claim 1 wherein said connecting portion has substantially a circular disk-like cross section on said hooking portion side of said bend but extending more and more disproportionately outward from said shank on said interior side of said bend at locations closer and closer to said eye as it extends along said shank to meet said hyrdrofoil portion, said connecting portion flaring outward somewhat as it meets said hydrofoil portion.

4. The apparatus of claim 1 wherein said eye extends beyond said substantially flat side of said hydrofoil portion.

5. The apparatus of claim 1 which further comprises a wire-like harness having a V-like shape with one end thereof connected to said eye and having a spinner rotatably connected at its opposite end, said harness having at its apex a connection means adapted for permitting other fishing means to be connected thereto.

6. The apparatus of claim 1 wherein discrete, flexible members are attached to said lure between said hydrofoil portion of said hydrodynamic effect body and said hooking portion of said fish hook, said discrete, flexible members being capable of extending past said hooking portion.

7. The apparatus of claim 2 wherein said thin layer extends on either side of said connecting portion to a distance at least three times that thickness occurring in said thin layer at a point halfway between an end thereof and said connecting portion.

8. The apparatus of claim 2 wherein said connecting portion has substantially a circular disk-like cross section on said hooking portion side of said bend but extending more and more disproportionately outward from said shank on said interior side of said bend at locations closer and closer to said eye as it extends along said shank to meet said hyrdrofoil portion, said connecting portion flaring outward somewhat as it meets said hydrofoil portion.

9. The apparatus of claim 2 wherein said eye extends beyond said substantially flat side of said hydrofoil portion.

10. The apparatus of claim 2 which further comprises a wire-like harness having a V-like shape with one end thereof connected to said eye and having a spinner rotatably connected at its opposite end, said harness having at its apex a connection means adapted for permitting other fishing means to be connected thereto.

11. The apparatus of claim 2 wherein discrete, flexible members are attached to said lure between said hydrofoil portion of said hydrodynamic effect body and said hooking portion of said fish hook, said discrete, flexible members being capable of extending past said hooking portion.

12. The apparatus of claim 3 which further comprises a wire-like harness having a V-like shape with one end thereof connected to said eye and having a spinner rotatably connected at its opposite end, said harness having at its apex a connection means adapted for permitting other fishing means to be connected thereto.

13. The apparatus of claim 3 wherein discrete, flexible members are attached to said lure between said hydrofoil portion of said hydrodynamic effect body and said hooking portion of said fish hook, said discrete, flexible members being capable of extending past said hooking portion.

14. The apparatus of claim 5 wherein said wire-like harness has said one end operatively connected to said eye by a wire loop extending through said eye and through an opening in said wire-like harness.

15. The apparatus of claim 7 wherein discrete, flexible members are attached to said lure between said hydrofoil portion of said hydrodynamic effect body and said hooking portion of said fish hook, said discrete, flexible members being capable of extending past said hooking portion.

16. The apparatus of claim 9 wherein said wire-like harness has end operatively connected to said eye by a wire loop extending through said eye and through an opening in said wire-like harness.

* * * * *

UNITED STATES PATENT AND TRADEMARK OFFICE
CERTIFICATE OF CORRECTION

PATENT NO. : 4,827,660

DATED : May 9, 1989

INVENTOR(S) : David H. Dudeck

It is certified that error appears in the above-identified patent and that said Letters Patent is hereby corrected as shown below:

Column 6, line 26, after "has", insert --said one--.

Signed and Sealed this

Sixteenth Day of January, 1990

*Attest:*

JEFFREY M. SAMUELS

*Attesting Officer*     *Acting Commissioner of Patents and Trademarks*